(12) United States Patent
Pinarbasi

(10) Patent No.: US 6,208,491 B1
(45) Date of Patent: Mar. 27, 2001

(54) SPIN VALVE WITH IMPROVED CAPPING LAYER STRUCTURE

(75) Inventor: Mustafa Pinarbasi, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/320,106

(22) Filed: May 26, 1999

(51) Int. Cl.$^7$ .................................................. G11B 5/39
(52) U.S. Cl. .............................. 360/324.1; 360/317
(58) Field of Search ...................... 360/317, 324.1, 360/324.12; 338/32 R; 324/252

(56) References Cited

U.S. PATENT DOCUMENTS

| | | | |
|---|---|---|---|
| 5,341,118 | * 8/1994 | Parkin et al. | 338/32 R |
| 5,408,377 | * 4/1995 | Gurney et al. | 360/113 |
| 5,432,734 | * 7/1995 | Kawano et al. | 365/158 |
| 5,598,308 | * 1/1997 | Dieny et al. | 360/113 |
| 5,731,936 | * 3/1998 | Lee et al. | 360/113 |

* cited by examiner

Primary Examiner—William Klimowicz
(74) Attorney, Agent, or Firm—Gray Cary Ware & Freidenrich; Ervin F. Johnston

(57) ABSTRACT

A capping structure is provided for a spin valve sensor which improves its magnetoresistive coefficient (dr/R). In one embodiment the capping structure includes a first layer of cobalt iron (CoFe) and a second layer of tantalum (Ta). In a second embodiment the capping structure includes a first layer of cobalt iron (CoFe) or cobalt (Co), a second layer of copper (Cu) and a third layer of tantalum (Ta).

45 Claims, 11 Drawing Sheets

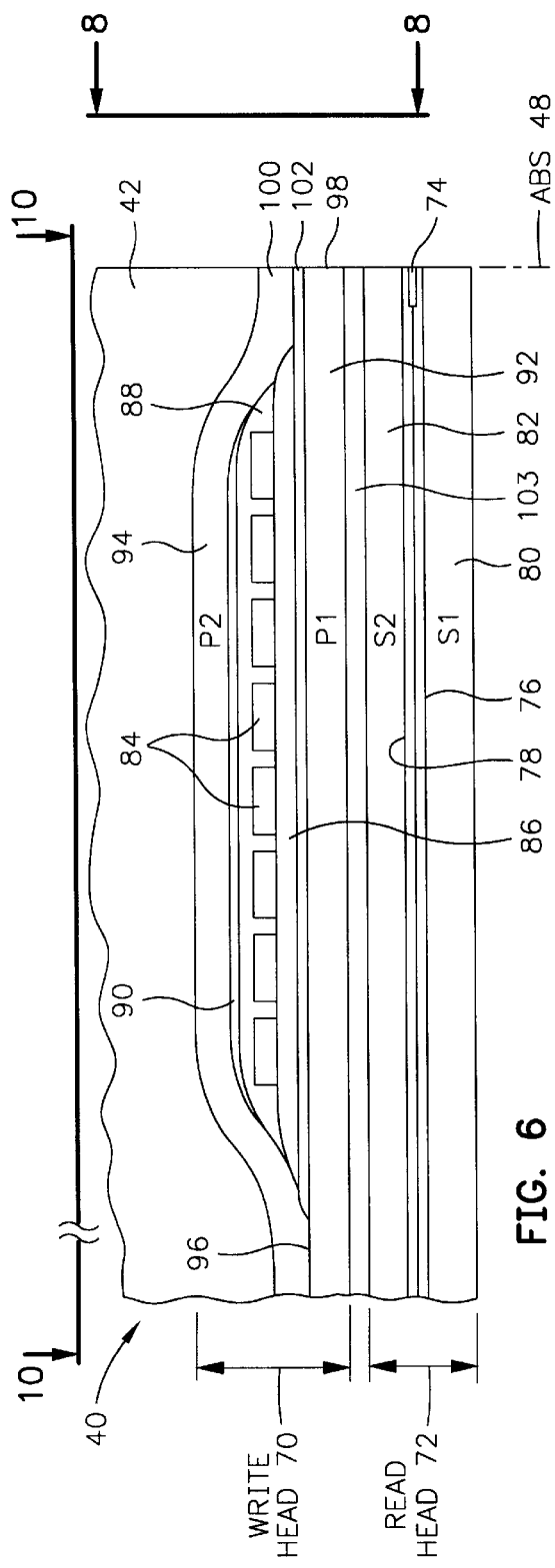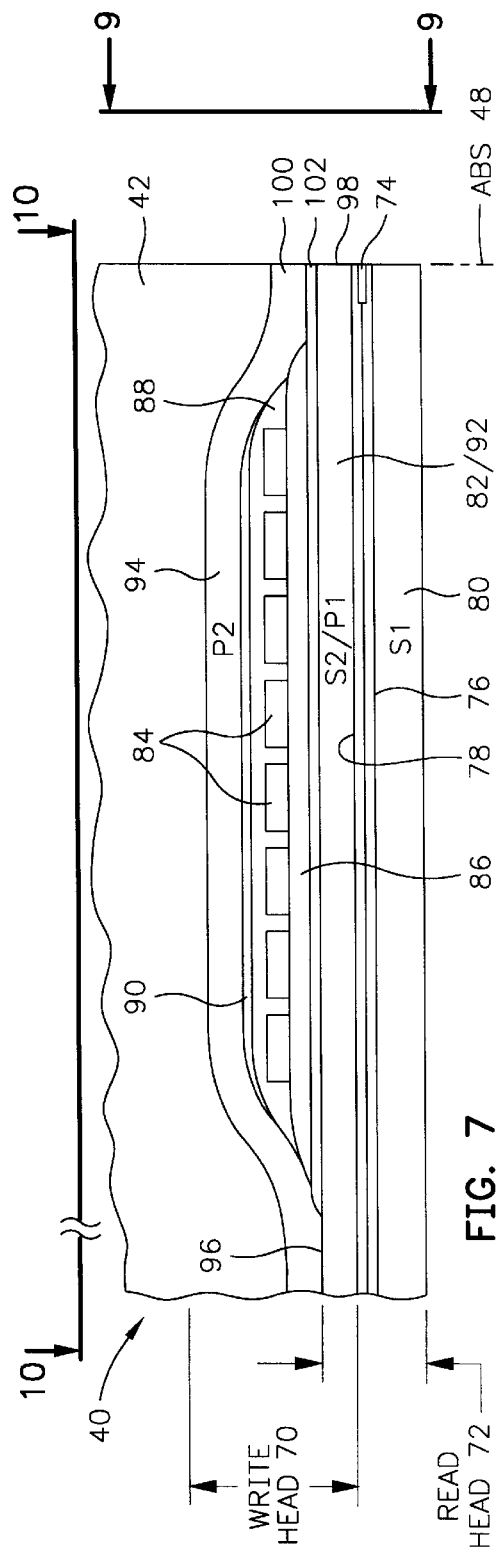

(ABS)

SPIN VALVE WITH IMPROVED CAPPING LAYER STRUCTURE

BACKGROUND OF THE INVENTION

1. Field of the Invention

The present invention relates to a spin valve with an improved capping layer structure and, more particularly, to a capping layer structure for a spin valve that improves a magnetoresistive coefficient and thermal stability.

2. Description of Related Art

An exemplary high performance read head employs a spin valve sensor for sensing magnetic fields on a moving magnetic medium, such as a rotating magnetic disk or a linearly moving magnetic tape. The sensor includes a non-magnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the magnetic medium. First and second leads are connected to the spin valve sensor for conducting a sense current therethrough. The magnetic moment of the free layer is free to rotate in positive and negative directions from a quiescent or zero bias point position in response to positive and negative magnetic signal fields from a moving magnetic medium. The quiescent position is the position of the magnetic moment of the free layer when the sense current is conducted through the sensor without magnetic field signals from a rotating magnetic disk. The quiescent position of the magnetic moment of the free layer is preferably parallel to the ABS. If the quiescent position of the magnetic moment is not parallel to the ABS the positive and negative responses of the free layer will not be equal which results in read signal asymmetry.

The thickness of the spacer layer is chosen so that shunting of the sense current and a magnetic coupling between the free and pinned layers are minimized. This thickness is less than the mean free path of electrons conducted through the sensor. With this arrangement, a portion of the conduction electrons is scattered by the interfaces or boundaries of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of cos θ, where θ is the angle between the magnetic moments of the pinned and free layers. This resistance, which changes when there are changes in scattering of conduction electrons, is referred to in the art as magnetoresistance (MR). Magnetoresistive coefficient is dr/R where dr is the change in magnetoresistance of the spin valve sensor from minimum magnetoresistance (magnetic moments of free and pinned layers parallel) and R is the resistance of the spin valve sensor at minimum magnetoresistance. For this reason a spin valve sensor sometimes referred to as a giant magnetoresistive (GMR) sensor. A spin valve sensor has a significantly higher magnetoresistive (MR) coefficient than an anisotropic magnetoresistive (AMR) sensor.

The spin valve sensor is located between first and second nonmagnetic nonconductive first and second read gap layers and the first and second read gap layers are located between ferromagnetic first and second shield layers. The distance between the first and second shield layers is referred to in the art as the read gap. The read gap determines the linear bit density of the read head. When a magnetic disk of a magnetic disk drive rotates adjacent the read sensor, the read sensor detects magnetic field signals from the magnetic disk only within the read gap, namely the distance between the first and second shield layers.

Efforts continue to increase the magnetoresistive coefficient (dr/R) of spin valve read heads. An increase in the magnetoresistive coefficient (dr/R) equates to higher bit density (bits/square inch of the rotating magnetic disk) read by the read head. One way to increase the magnetoresistive coefficient (dr/R) is to improve the performance of the various layers of the spin valve sensor. For instance, it is important that the ferromagnetic layers of the spin valve sensor have a uniform texture so as to promote stability of the magnetization of the layer. Further, the compositions of adjacent layers are important. When a first layer is formed on a second layer the characteristics of the first layer are somewhat dependent upon the characteristics of the second layer. This may be due to the grain structure of the second layer being affected by the grain structure of the first layer or a partial diffusion of the layers at the interface.

It should be understood that the performance of the spin valve sensor can be affected by subsequent processing steps, such as setting the magnetization of the hard bias layers, formation of the second shield layer and hard baking of photoresist layers to form the insulation stack of the write head. A temperature of 230° C.–250° C. for a period of 10 hours is typically employed for hard baking the photoresist layers of the insulation stack. This hard baking is done in the presence of a field which is perpendicular to the ABS so as not to disturb the orientation of the magnetic spins of the antiferromagnetic pinning layer of the spin valve sensor. However, the high temperature annealing typically causes a reduction in the magnetoresistive coefficient (dr/R) of the spin valve sensor due to a change in the texture of the layers or interfacial interaction between adjacent layers.

SUMMARY OF THE INVENTION

I have discovered a unique capping layer structure for a spin valve head which improves its magnetoresistive coefficient (dr/R) after the spin valve sensor has been subjected to high heat conditions such as 230° C. for a prolonged period of time. In a bottom spin valve the capping layer interfaces the free layer which is typically nickel iron (NiFe). My first investigation was a 50 Å of tantalum (Ta) capping layer structure formed directly on the nickel iron (NiFe) free layer. The magnetoresistive coefficient (dr/R) of a spin valve sensor having this capping layer structure in the as deposited state was 4.72%. After annealing at a high temperature, however, the magnetoresistive coefficient (dr/R) dropped to 3.84%.

In my invention the capping layer structure includes a first layer of cobalt iron (CoFe) and a second layer of a non-magnetic metallic material such as tantalum (Ta). With a first layer of 5 Å0 of cobalt iron (CoFe) located between and interfacing a nickel iron (NiFe) free layer and a second layer of 50 Å of tantalum (Ta) the magnetoresistive coefficient (dr/R) of the spin valve sensor in the as deposited state was 4.84%. After annealing at a high temperature the magnetoresistive coefficient (dr/R) was 4.11%. Accordingly, this embodiment of the invention resulted in an increase in the magnetoresistive coefficient (dr/R) of 7% after annealing over the aforementioned first investigation.

An object of the present invention is to provide a capping layer structure for a spin valve sensor which improves its magnetoresistive coefficient (dr/R) after annealing.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
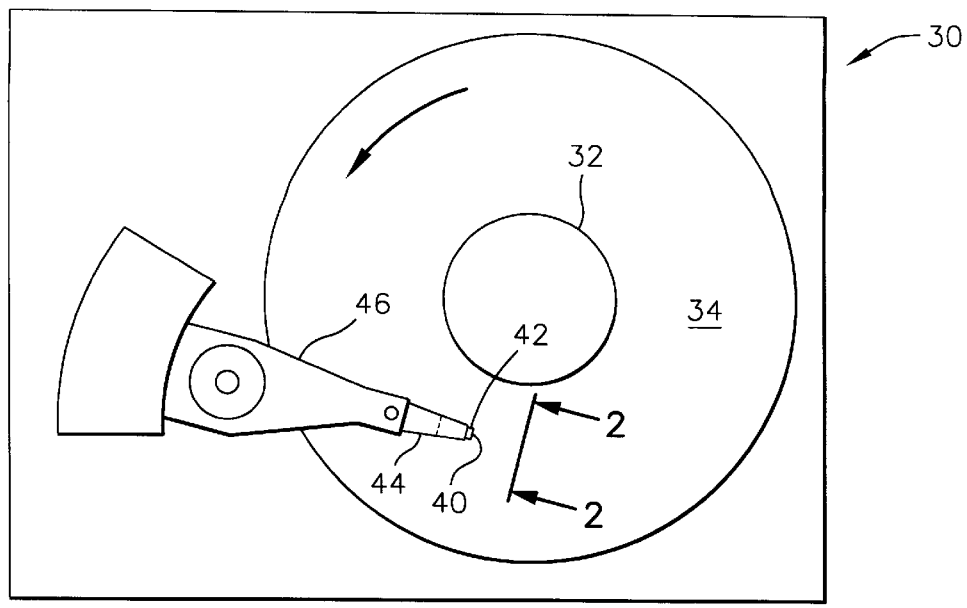
FIG. 1 is a plan view of an exemplary magnetic disk drive.
Figure 2:
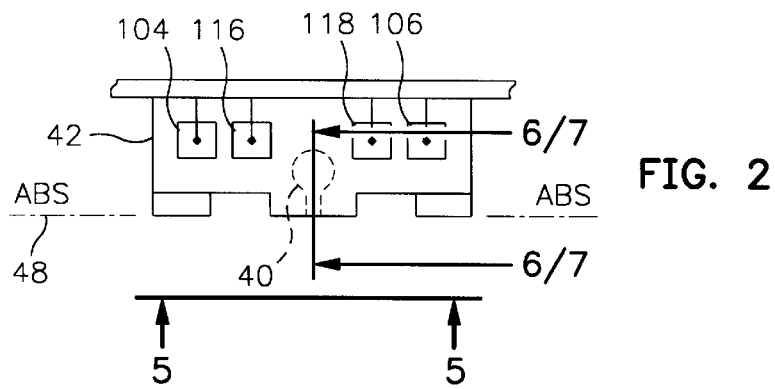
FIG. 2 is an end view of a slider with a magnetic head of the disk drive as seen in plane 2—2.
Figure 3:
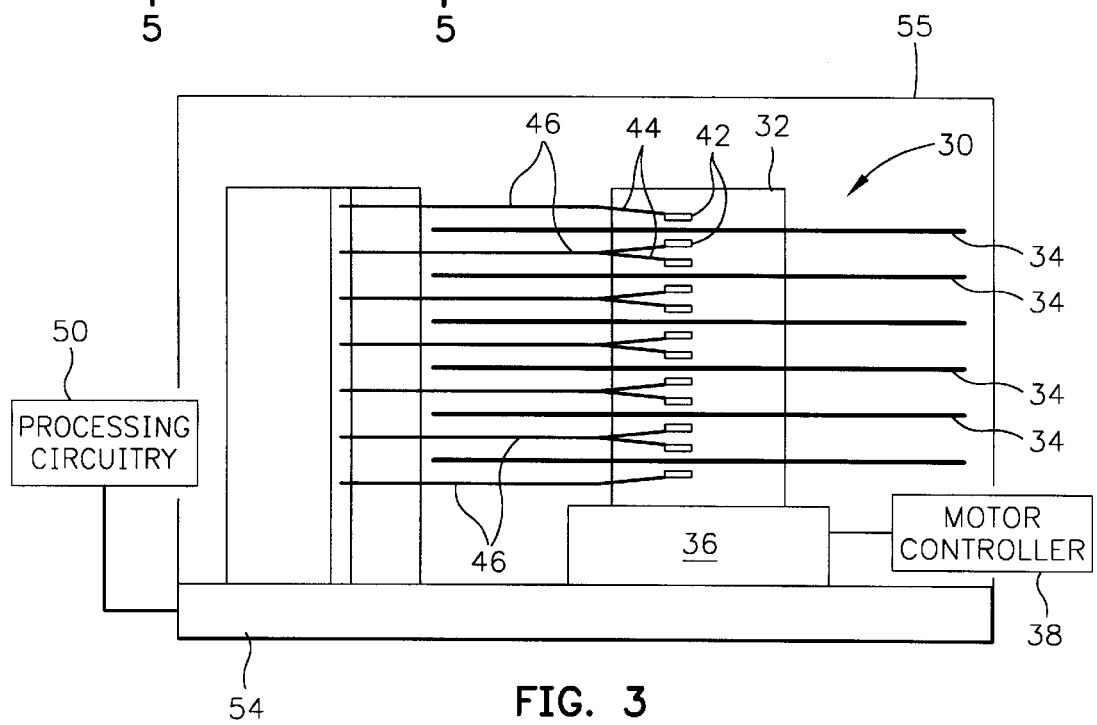
FIG. 3 is an elevation view of the magnetic disk drive wherein multiple disks and magnetic heads are employed.
Figure 4:
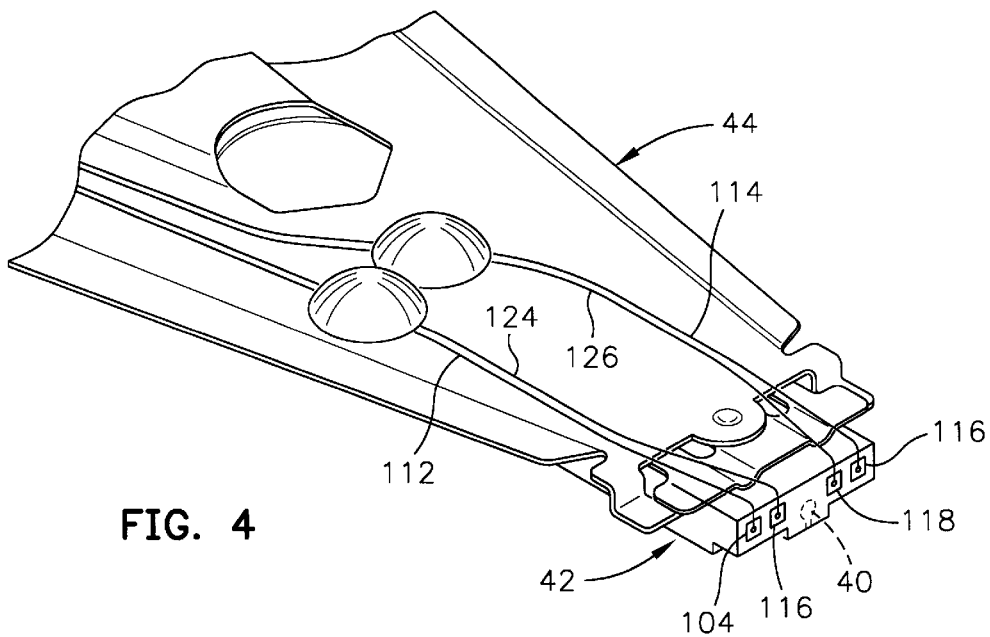
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A slider 42 supports a combined read and write magnetic head assembly 40 and is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing, as shown in FIG. 3.

Figure 5:
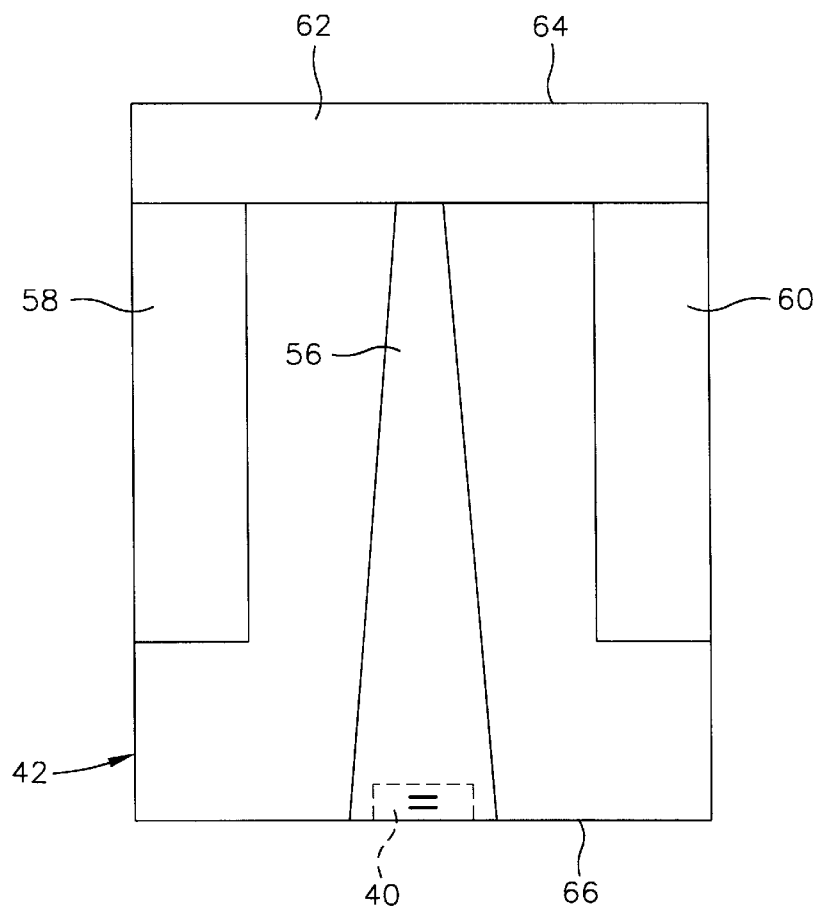
FIG. 5 is an ABS view of the magnetic head taken along plane 5—5 of FIG. 2.
Figure 10:
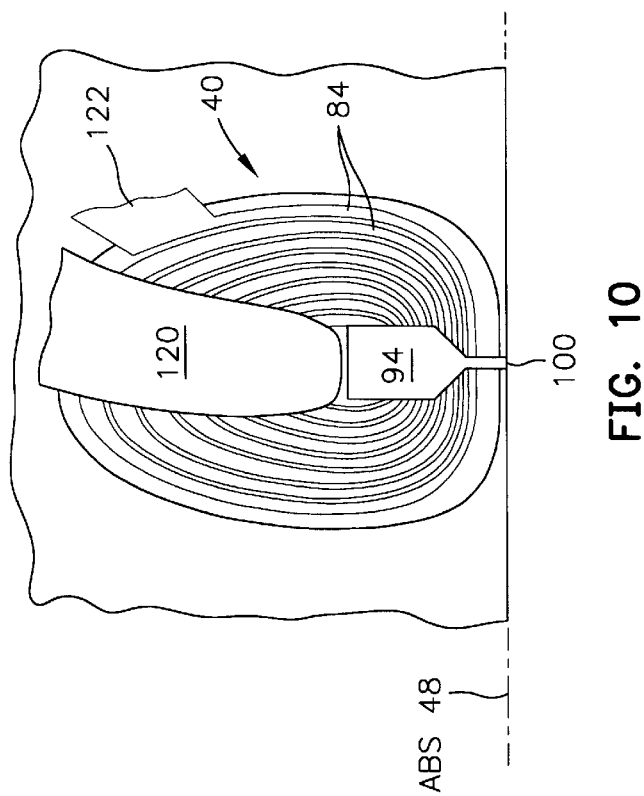
FIG. 10 is a view taken along plane 10—10 of FIGS. 6 or 7 with all material above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
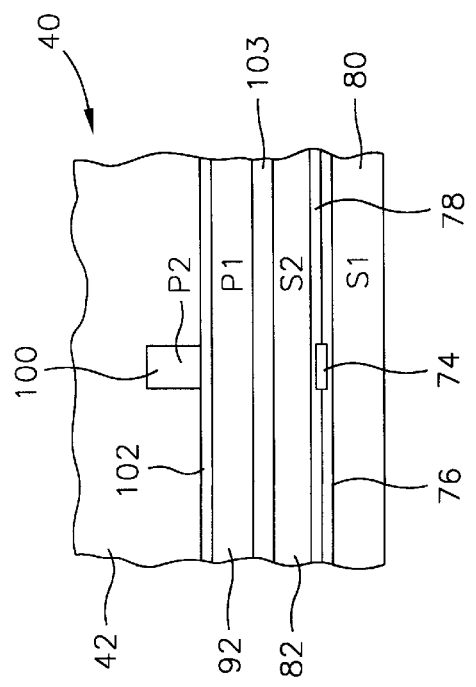
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to signal fields from a rotating magnetic disk, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
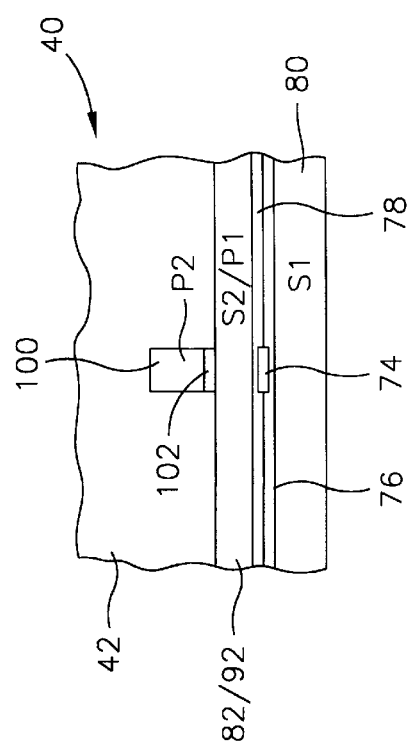
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
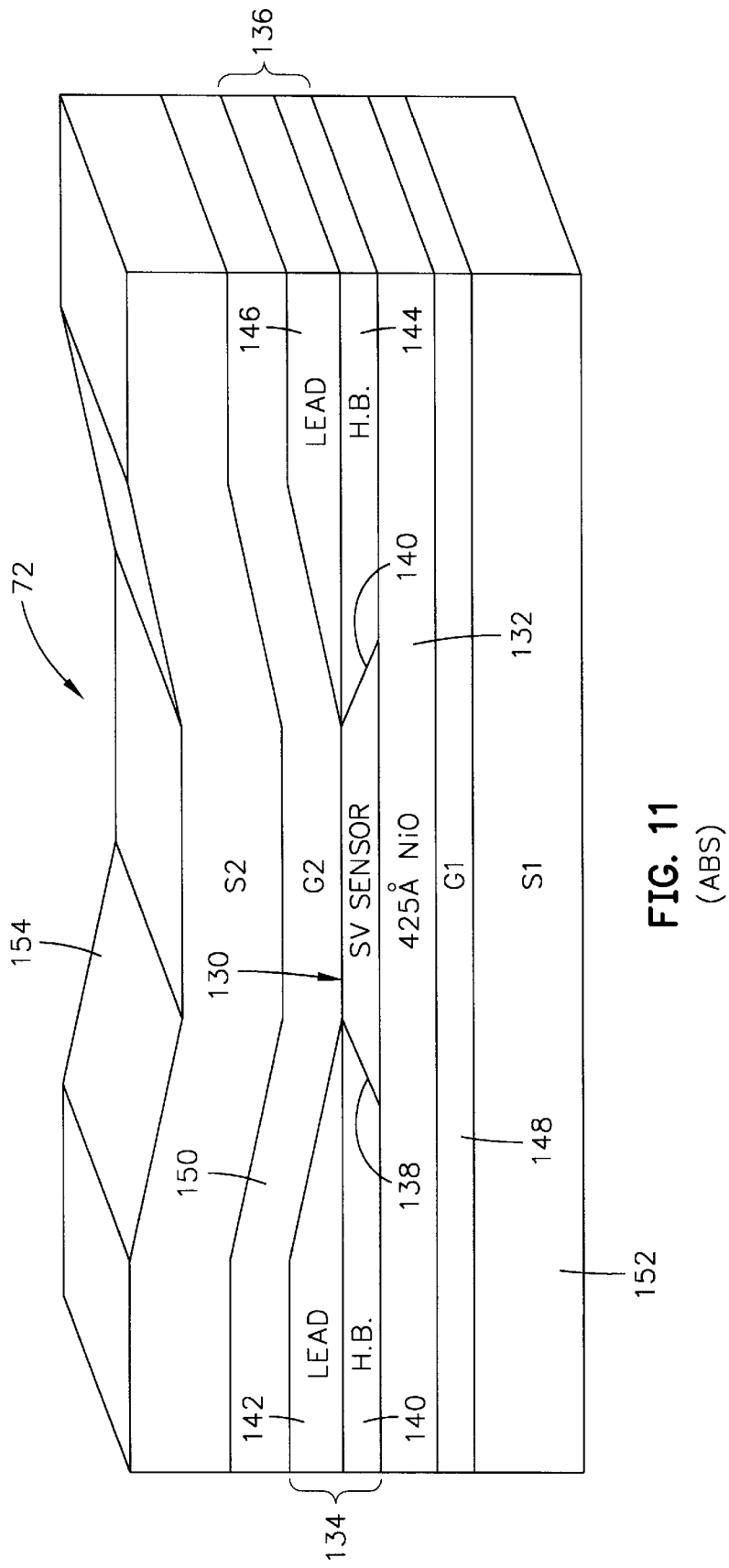
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, has a magnetic moment that is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor which is known in the art as a contiguous junction. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

In each of the following examples a series of magnetic and/or annealing steps were conducted and the results in the form of resistance (R), magnetoresistance coefficient (dr/R) in percent and ferromagnetic coupling field ($H_F$) were measured. The resistance R is the resistance of the spin valve sensor in ohms/square, the magnetoresistive coefficient (dr/R) is the magnetoresistive coefficient (dr/R) of the spin valve sensor and the ferromagnetic coupling field ($H_F$) is the field in oersteds exerted by the pinned layer on the free layer through the spacer layer. In each of the examples the nickel oxide (NiO) pinning layer was initially reset by subjecting the spin valve sensor to a field of 12,000 oersteds for a period of about 1 hour at 230° C. in a direction perpendicular to the ABS for orienting the magnetic spins of the pinning layer in the same direction. The spin valve sensor was then annealed at 230° C. for a period of 10 hours followed by a second reset of the nickel oxide (NiO) pinning layer at 12,000 Oe for 1 hour at 230° C. The spin valve sensor was then subjected to a second annealing at 250° C. for a period of 6 hours. Finally, the nickel oxide (NiO) pinning layer was reset for the third time by subjecting the spin valve sensor to 12,000 Oe for 1 hour at 230° C. After each of these steps the resistance (R), the magnetoresistive coefficient (dr/R) and the ferromagnetic coupling field ($H_F$) was measured.

EXAMPLE 1

Figure 12:
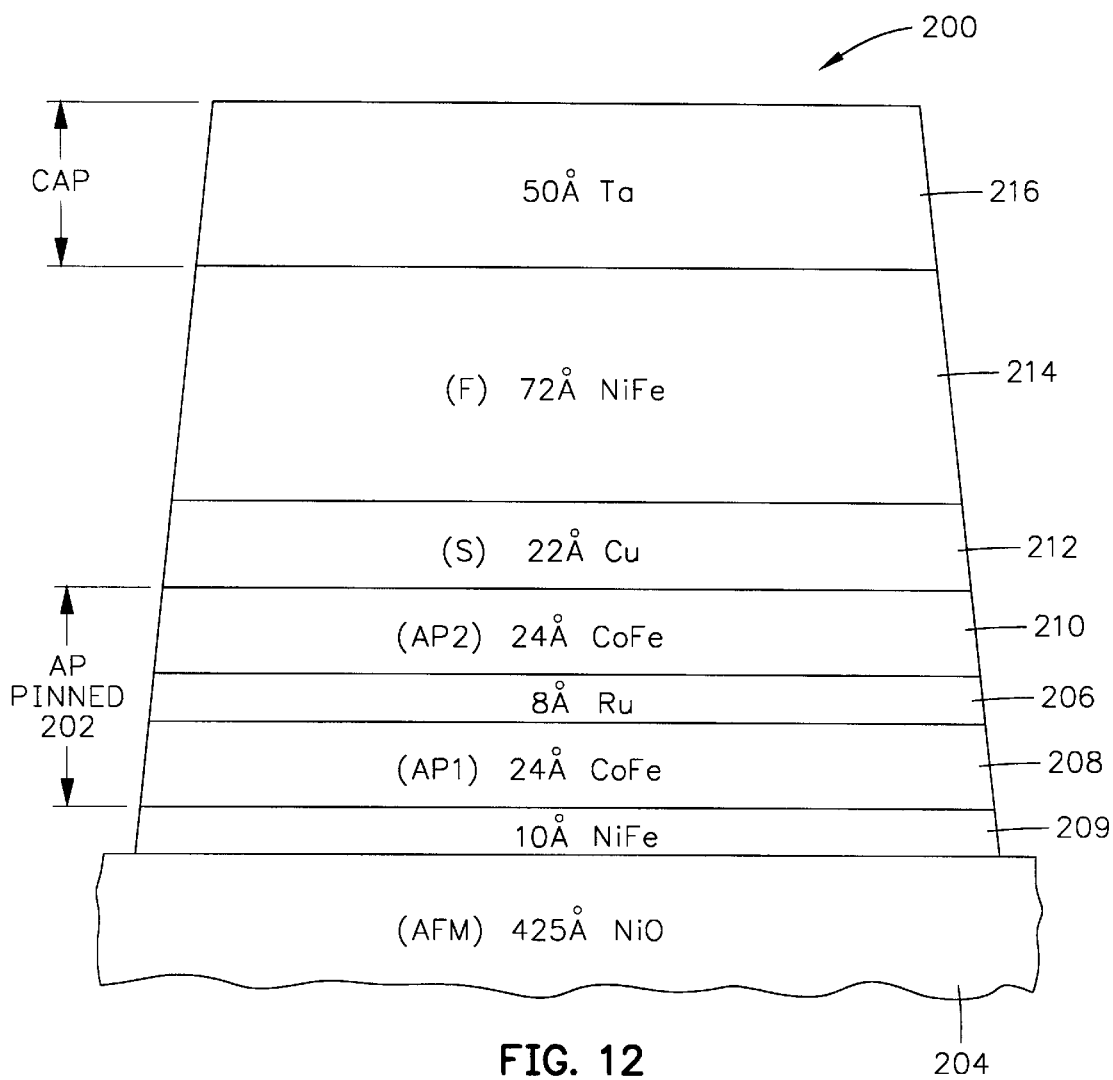
FIG. 12 is an ABS illustration of various layers of a first example of a spin valve sensor.

A first capping layer structure investigated by me is shown in a spin valve sensor 200 in FIG. 12. This spin valve sensor includes an antiparallel (AP) pinned layer structure 202 which is exchange coupled to an antiferromagnetic (AFM) pinning layer 204. The AP pinned layer structure 202 includes an antiparallel layer (AP) coupling layer 206 which is located between a ferromagnetic first antiparallel layer (AP1) 208 and a second ferromagnetic antiparallel layer (AP2) 210. The antiparallel coupling layer 206 is 8 Å of ruthenium (Ru) and each of the antiparallel pinned layers are 24 Å of cobalt iron ($Co_{90}Fe_{10}$). The antiferromagnetic layer 204 is 425 Å of nickel oxide (NiO). In order to promote an improved interface between the antiferromagnetic layer 204 and the first antiparallel layer 208 an interlayer 209 of 10 Å of nickel iron (NiFe) is located therebetween. A nonmagnetic electrically conductive spacer layer (S) 212 is located between the second antiparallel layer 210 and a ferromagnetic free layer (F) 214. The spacer layer 212 is 22 Å of copper (Cu) and the free layer 214 is 72 Å of nickel iron (NiFe). The capping layer structure in this embodiment is a single layer 216 of 50 Å of tantalum (Ta) directly on the free layer 214.

After an initial resetting of the magnetic spins of the nickel oxide (NiO) antiferromagnetic layer 204, the resistance of the spin valve sensor was 15.36 ohms/sq., the magnetoresistive coefficient (dr/R) was 4.72% and the ferromagnetic coupling field ($H_F$) was 4.25 Oe. After annealing the spin valve sensor at 230° C. the resistance (R) was 15.95 ohms/sq., the magnetoresistive coefficient (dr/R) was 3.98% and the ferromagnetic coupling field ($H_F$) was 2.88 Oe. After again resetting the nickel oxide (NiO) antiferromagnetic layer 204 the resistance (R) was 16.56 ohms/sq., the magnetoresistive coefficient (dr/R) was 4.14% and the ferromagnetic coupling field ($H_F$) was 2.94 Oe. After further annealing the spin valve sensor at 250° C. the resistance (R) was 16.38 ohms/sq., the magnetoresistive coefficient (dr/R) was 3.55% and the ferromagnetic coupling field ($H_F$) was 2.64 Oe. After finally resetting the antiferromagnetic layer 204 the resistance (R) was 16.66 ohms/sq., the magnetoresistive coefficient (dr/R) was 3.84% and the ferromagnetic coupling field ($H_F$) was 2.9 Oe. The results of this test are shown in the following chart I.

Chart I

|  | R (/) | dr/R (%) | Hf |
|---|---|---|---|
| Ini NiO reset | 15.36 | 4.72 | 4.25 |
| 230C Anneal | 15.95 | 3.98 | 2.88 |
| NiO reset | 16.56 | 4.14 | 2.94 |
| 250C Anneal | 16.38 | 3.55 | 2.64 |
| NiO reset | 16.66 | 3.84 | 2.90 |

EXAMPLE 2

Figure 13:
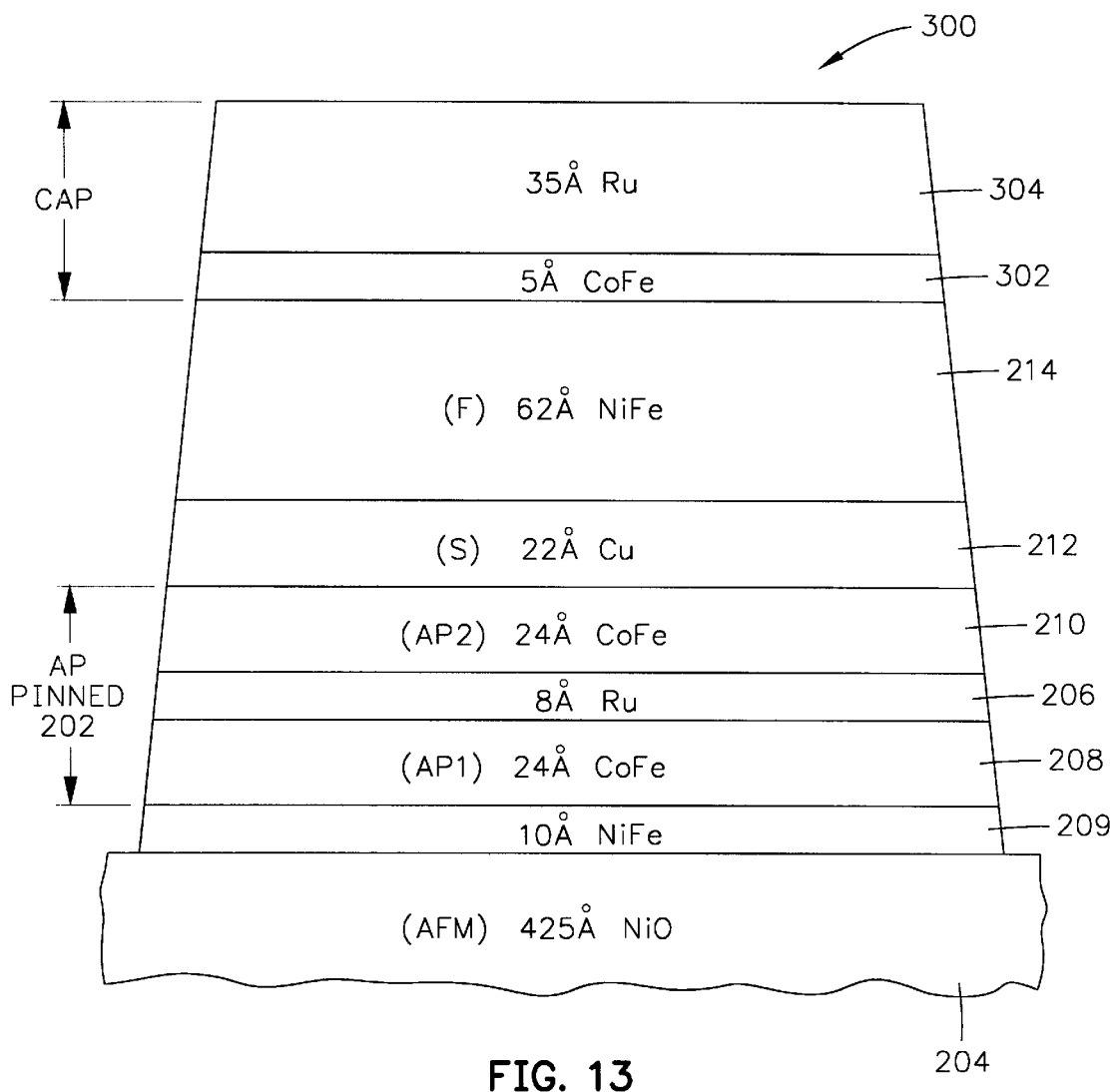
FIG. 13 is an ABS illustration of various layers of a second example of a spin valve sensor.

The spin valve sensor shown at 300 in FIG. 13 is the same as the spin valve sensor 200 shown in FIG. 12, except the free layer 214 is 62 Å of nickel iron (NiFe) and a different capping layer structure is employed. The capping layer structure includes a first layer 302 of cobalt iron ($Co_{90}Fe_{10}$) and a second layer 304 of ruthenium (Ru). The cobalt iron ($Co_{90}Fe_{10}$) first layer 302 is 5 Å thick and the second layer 304 of ruthenium (Ru) is 35 Å thick.

After initial nickel oxide (NiO) reset of the AFM layer 204, the resistance (R) was 15.14 ohms/sq., the magnetoresistive coefficient (dr/R) was 4.32% and the ferromagnetic coupling field ($H_F$) was 4.67 Oe. After annealing the spin valve sensor at 230° C. the resistance (R) was 15.88 ohms/sq., the magnetoresistive coefficient (dr/R) was 3.4% and the ferromagnetic coupling field ($H_F$) was 4.43 Oe. After again resetting the nickel oxide (NiO) AFM layer 204 the resistance (R) was 15.66 ohms/sq., the magnetoresistive coefficient (dr/R) was 3.51% and the ferromagnetic coupling field ($H_F$) was 4.73 Oe. After further annealing at 250° C. the resistance (R) was 16.23 ohms/sq., the magnetoresistive coefficient (dr/R) was 2.91% and the ferromagnetic coupling field ($H_F$) was 4.31 Oe. After a final reset of the nickel oxide (NiO) AFM layer 204 the resistance (R) was 16.8 ohms/sq., the magnetoresistive coefficient was 2.85% and the ferromagnetic coupling field ($H_F$) was 2.99 Oe. The results are shown in the following Chart II. It can be seen in Example 2 that the magnetoresistive coefficient (dr/R) was 2.85% as compared to the magnetoresistive coefficient (dr/R) in Example 1 of 3.84%. Accordingly, the performance of the spin valve sensor shown in Example 2 will be considerably less than the performance of the spin valve sensor shown in Example 1.

| Chart II | | | |
|---|---|---|---|
| | R (/) | dr/R (%) | Hf |
| Ini NiO reset | 15.14 | 4.32 | 4.67 |
| 230C Anneal | 15.88 | 3.40 | 4.43 |
| NiO reset | 15.66 | 3.51 | 4.73 |
| 250C Anneal | 16.23 | 2.91 | 4.31 |
| NiO reset | 16.80 | 2.85 | 2.99 |

EXAMPLE 3

Figure 14:
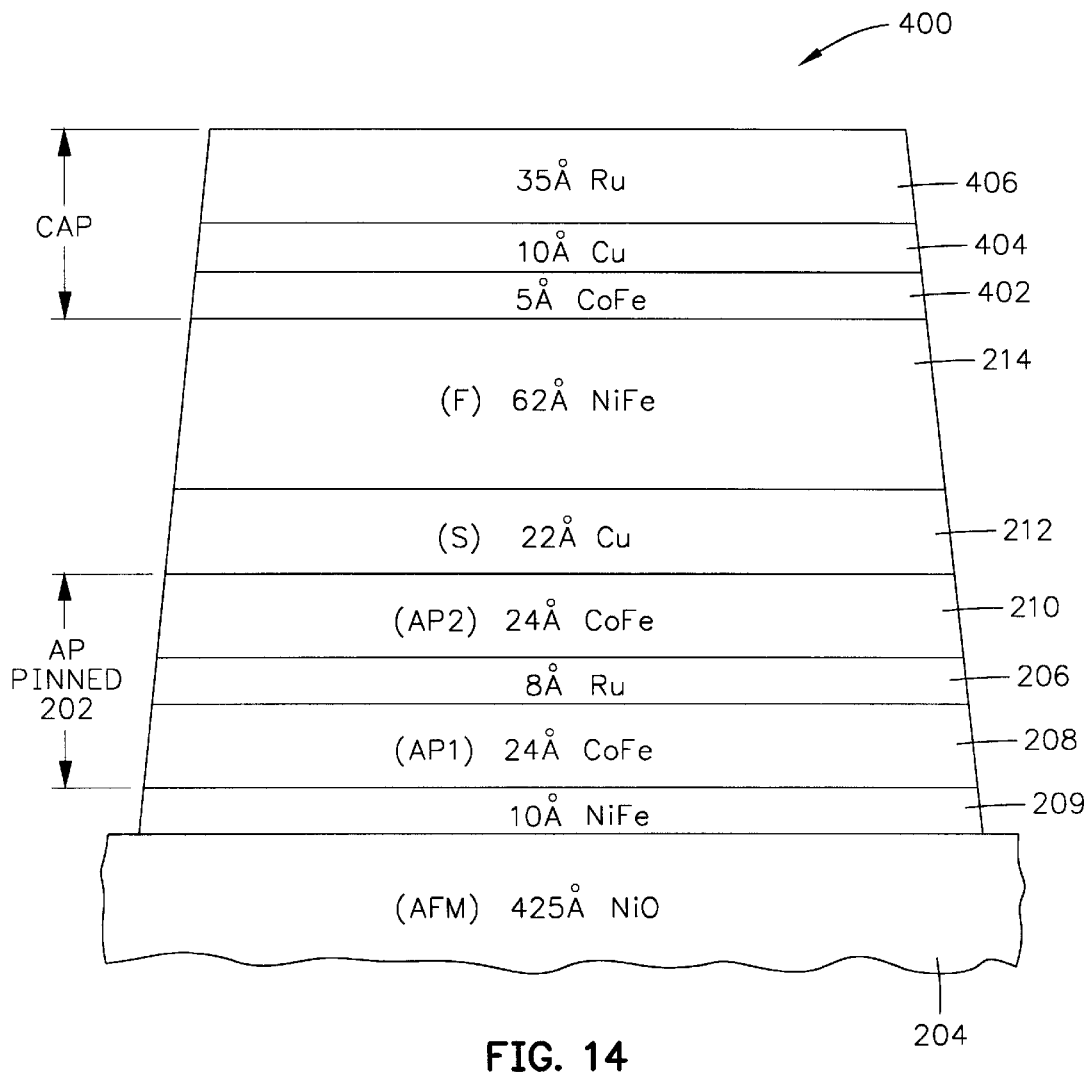
FIG. 14 is an ABS illustration of various layers of a third example of a spin valve sensor.

The spin valve sensor shown at 400 in FIG. 14 is the same as the spin valve sensor shown in FIG. 13, except a different capping layer structure is employed. The capping layer structure employed in the spin valve sensor 400 is a first layer of cobalt iron ($Co_{90}Fe_{10}$) directly on the free layer 214, a second layer 404 of copper (Cu) directly on the first layer 402 and a third layer 406 of ruthenium (Ru) directly on the second layer 404. The first layer is 5 Å of cobalt iron (CoFe), the second layer 404 is 10 Å of copper (Cu) and the third layer 406 is 35 Å of ruthenium (Ru).

After an initial nickel oxide (NiO) reset of the AFM layer 204 the resistance (R) was 13.40 ohm/sq., the magnetoresistive coefficient (dr/R) was 3.90% and the ferromagnetic coupling field ($H_F$) was 4.33 Oe. After annealing at 230° C. the resistance (R) was 14.08 ohms/sq., the magnetoresistive coefficient (dr/R) was 3.01% and the ferromagnetic coupling field ($H_F$) was 3.2 Oe. After another reset of the nickel oxide (NiO) AFM layer 204 the resistance (R) was 13.9 ohms/sq., the magnetoresistive coefficient (dr/R) was 3.01% and the ferromagnetic coupling field ($H_F$) was 3.4 Oe. After further annealing at 250° C. the resistance (R) was 14.43 ohms/sq., the magnetoresistive coefficient (dr/R) was 2.54% and the ferromagnetic coupling field ($H_F$) was 2.04 Oe. After a final reset of the nickel oxide (NiO) AFM layer 204 the resistance (R) was 15.32 ohms/sq., the magnetoresistive coefficient (dr/R) was 2.65% and the ferromagnetic coupling field ($H_F$) was 2.69 Oe. The results are tabulated in the following Chart III. It can be seen from the following chart that the magnetoresistive coefficient (dr/R) was only 2.65% as compared to 3.84% for Example 1. Accordingly, the spin valve sensor 400 shown in FIG. 14 will have reduced performance compared to the spin valve sensor 200 shown in FIG. 12. However, the resistance (R) and the ferromagnetic coupling field ($H_F$) of Example 3 were favorable.

| Chart III | | | |
|---|---|---|---|
| | R (/) | dr/R (%) | Hf |
| Ini NiO reset | 13.40 | 3.90 | 4.33 |
| 230C Anneal | 14.08 | 3.01 | 3.20 |
| NiO reset | 13.90 | 3.01 | 3.40 |
| 250C Anneal | 14.43 | 2.54 | 2.04 |
| NiO reset | 15.32 | 2.65 | 2.69 |

EXAMPLE 4

First Embodiment of the Invention

Figure 15:
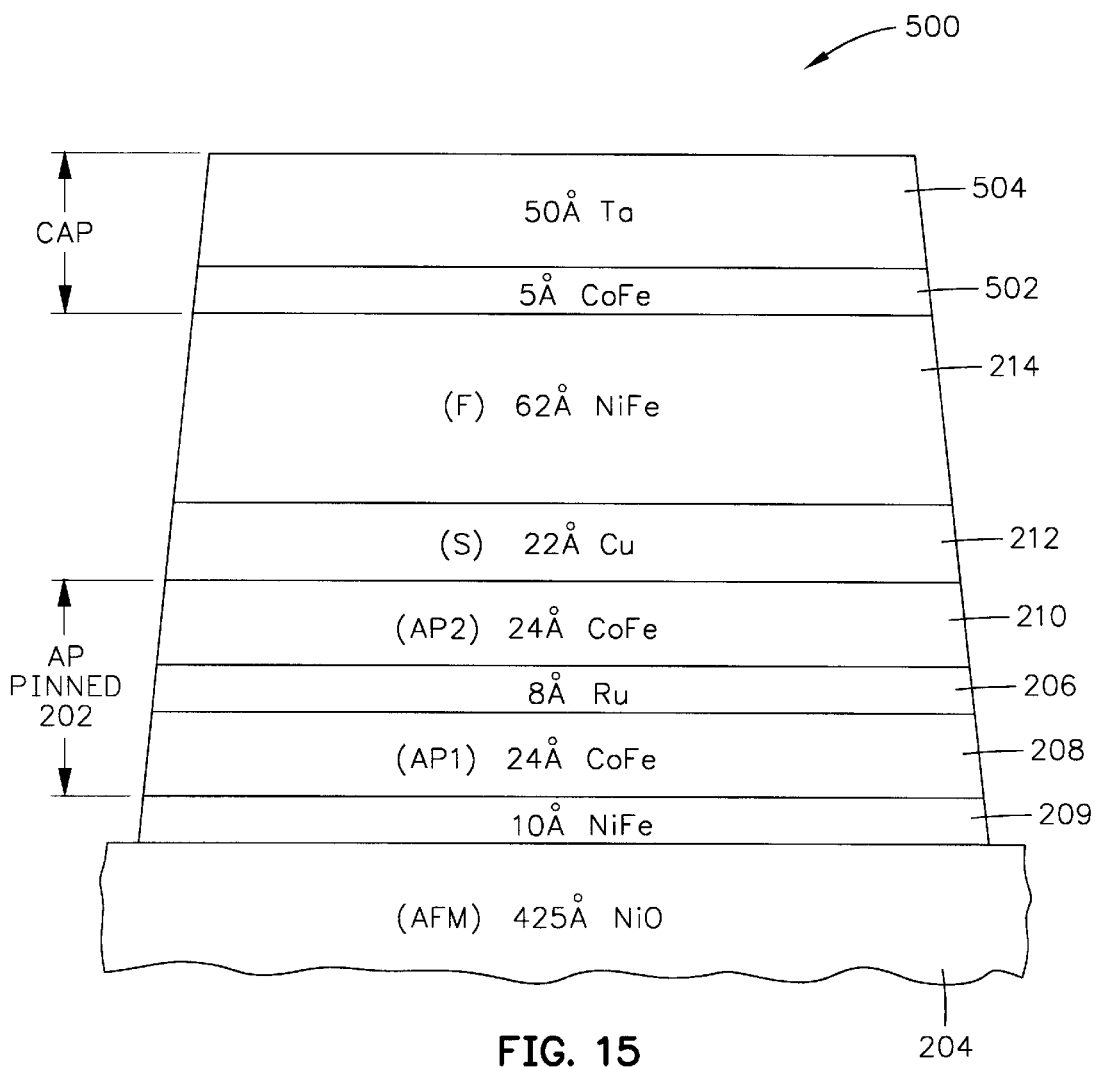
FIG. 15 is an ABS illustration of a first embodiment of the present spin valve sensor.

The spin valve sensor shown at 500 in FIG. 15 is the same as the spin valve sensor shown at 300 in FIG. 13 except a different capping layer structure is employed. The capping layer structure employed in the first embodiment of the present invention is a first layer 502 of cobalt iron ($Co_{90}Fe_{10}$) directly on the free layer 214 and a second layer 504 of tantalum (Ta) directly on the first layer 502. The first layer is 5 Å of cobalt iron ($Co_{90}Fe_{10}$) and the second layer is 50 Å of tantalum (Ta). In a preferred embodiment the cobalt iron (CoFe) layer 502 is thinner than the tantalum (Ta) layer 504. It is further preferred the cobalt iron (CoFe) layer 502 be less than 10 Å and preferably 5 Å.

After initial nickel oxide (NiO) reset of the AFM layer 204 the resistance (R) was 16.51 ohms/sq., the magnetoresistive coefficient (dr/R) was 4.84% and the ferromagnetic coupling field ($H_F$) was 5.39 Oe. After annealing at 230° C. the resistance (R) was 17.11 ohms/sq., the magnetoresistive coefficient (dr/R) was 3.65% and the ferromagnetic coupling field ($H_F$) was 4.37 Oe. After a second reset of the nickel oxide (NiO) AFM layer 204 the resistance (R) was 16.83 ohms/sq., the magnetoresistive coefficient (dr/R) was 4.21% and the ferromagnetic coupling field ($H_F$) was 5.15 Oe. After further annealing at 250° C. the resistance (R) was 17.6 ohms/sq., the magnetoresistive coefficient (dr/R) was 3.69% and the ferromagnetic coupling field ($H_F$) was 3.05 Oe. After a final reset of the nickel oxide (NiO) AFM layer 204 the resistance (R) was 17.6 ohms/sq., the magnetoresistive coefficient (dr/R) was 4.11%, and the ferromagnetic coupling field ($H_F$) was 5.33 Oe. The results are shown in the following chart IV. It can be seen from this example that the magnetoresistive coefficient (dr/R) was 4.11%, which is an improvement over the magnetoresistive coefficient (dr/R) of 3.84% in the first example shown in FIG. 12. In the present example the resistance (R) and the ferromagnetic coupling field ($H_F$) increased slightly compared to the first example shown in FIG. 12. The most important consideration is the improvement in the magnetoresistive coefficient (dr/R) making this example an improvement over the example shown in FIG. 12.

| Chart IV | | | |
|---|---|---|---|
| | R (/) | dr/R (%) | Hf |
| Ini NiO reset | 16.51 | 4.84 | 5.39 |
| 230C Anneal | 17.11 | 3.65 | 4.37 |
| NiO reset | 16.83 | 4.21 | 5.15 |
| 250C Anneal | 17.60 | 3.69 | 3.05 |
| NiO reset | 17.60 | 4.11 | 5.33 |

EXAMPLE 5

Second Embodiment of the Invention

Figure 16:
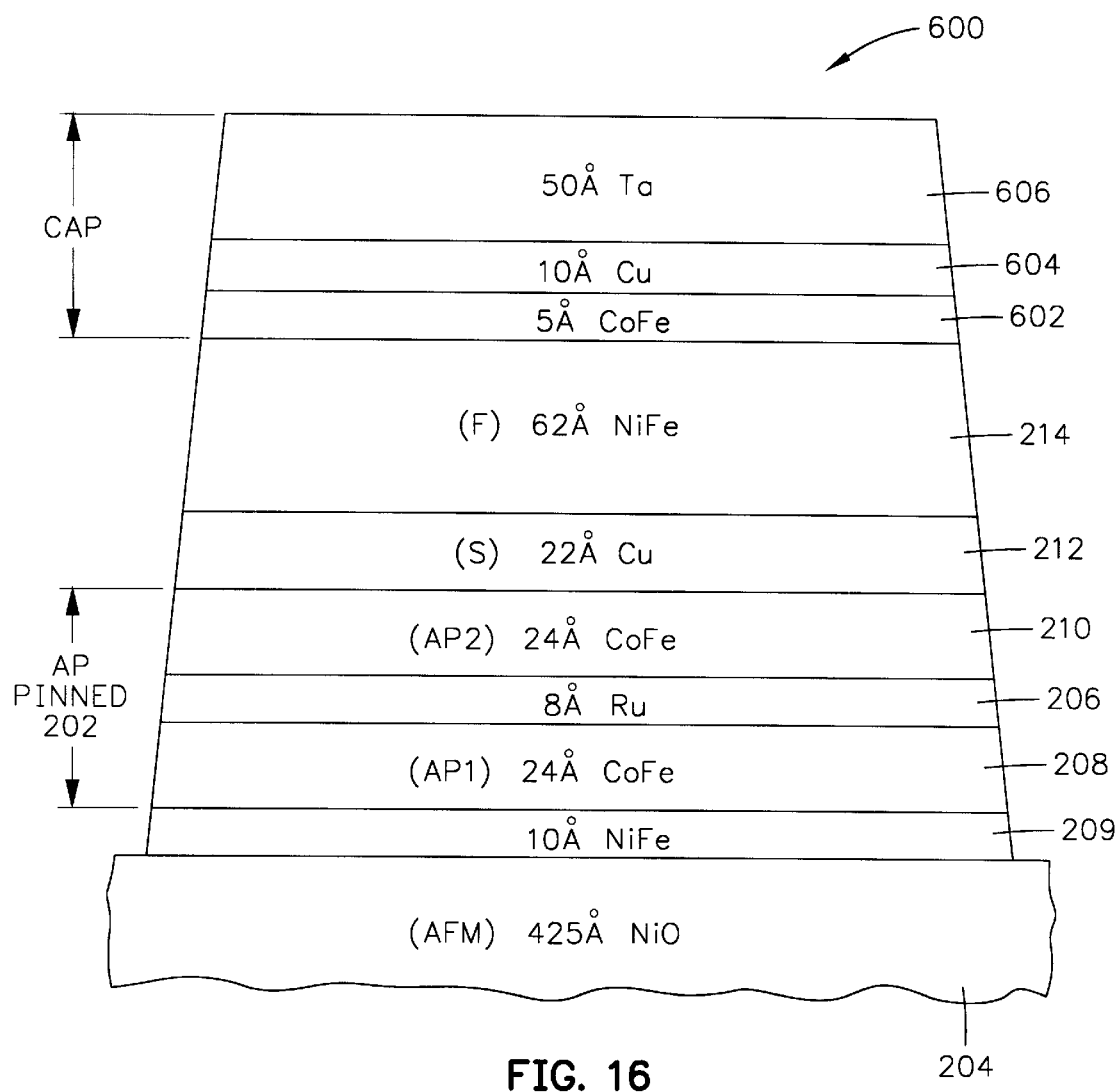
FIG. 16 is an ABS illustration of various layers of a second embodiment of the present spin valve sensor.

The spin valve sensor shown at 600 in FIG. 16 is the same as the spin valve sensor 500 shown in FIG. 15 except a different capping layer structure is employed. The capping layer structure in this second embodiment of the present invention includes a first layer 602 of cobalt iron ($Co_{90}Fe_{10}$) directly on the free layer 214, a second layer 604 of copper (Cu) directly on the first layer 602 and a third layer 606 of tantalum (Ta) directly on the second layer 604. The first layer 602 is 5 Å of cobalt iron ($Co_{90}Fe_{10}$), the second layer 604 is 10 Å of copper (Cu) and the third layer 606 is 50 Å of tantalum (Ta). It is further preferred that the first layer be less than 10 Å and preferably 5 Å.

After an initial nickel oxide (NiO) reset of the AFM layer 204 the resistance (R) was 15.18 ohms/sq., the magnetoresistive coefficient (dr/R) was 4.54% and the ferromagnetic coupling field ($H_F$) was 2.03 Oe. After annealing at 230° C.

the resistance (R) was 15.44 ohms/sq., the magnetoresistive coefficient (dr/R) was 3.49% and the ferromagnetic coupling field ($H_F$) was 1.08 Oe. After a second reset of the nickel oxide (NiO) AFM layer 204 the resistance (R) was 15.39 ohms/sq., the magnetoresistive coefficient (dr/R) was 4.11% and the ferromagnetic coupling field ($H_F$) was 1.74 Oe. After further annealing at 250° C. the resistance (R) was 16.57 ohms/sq., the magnetoresistive coefficient (dr/R) was 3.89% and the ferromagnetic coupling field ($H_F$) was 0.66 Oe. After a final reset of the nickel oxide (NiO) AFM layer 204 the resistance (R) was 16.08 ohms/sq., the magnetoresistive coefficient (dr/R) was 4.01% and the ferromagnetic coupling field ($H_F$) was 0.54 Oe. The results are shown in the following chart V. It can be seen from this example that the magnetoresistive coefficient (dr/R) of 4.01% was an increase over the magnetoresistive coefficient (dr/R) of 3.84% for example 1 shown in FIG. 12 and was 0.10% less than the magnetoresistive coefficient (dr/R) of example 4 shown in FIG. 15. The resistance (R) was 16.08 ohms/sq. which is slightly less than the resistance (R) of 17.6 ohms/sq.in example 4 and there was a significant reduction in the ferromagnetic coupling field ($H_F$) which was 0.54 Oe as compared to 5.33 Oe in example 4.

Chart V

|  | R (/) | dr/R (%) | Hf |
| --- | --- | --- | --- |
| Ini NiO reset | 15.18 | 4.54 | 2.03 |
| 230C Anneal | 15.44 | 3.49 | 1.08 |
| NiO reset | 15.39 | 4.11 | 1.74 |
| 250C Anneal | 16.57 | 3.89 | 0.66 |
| NiO reset | 16.08 | 4.01 | 0.54 |

EXAMPLE 6

Third Embodiment of the Invention

Figure 17:
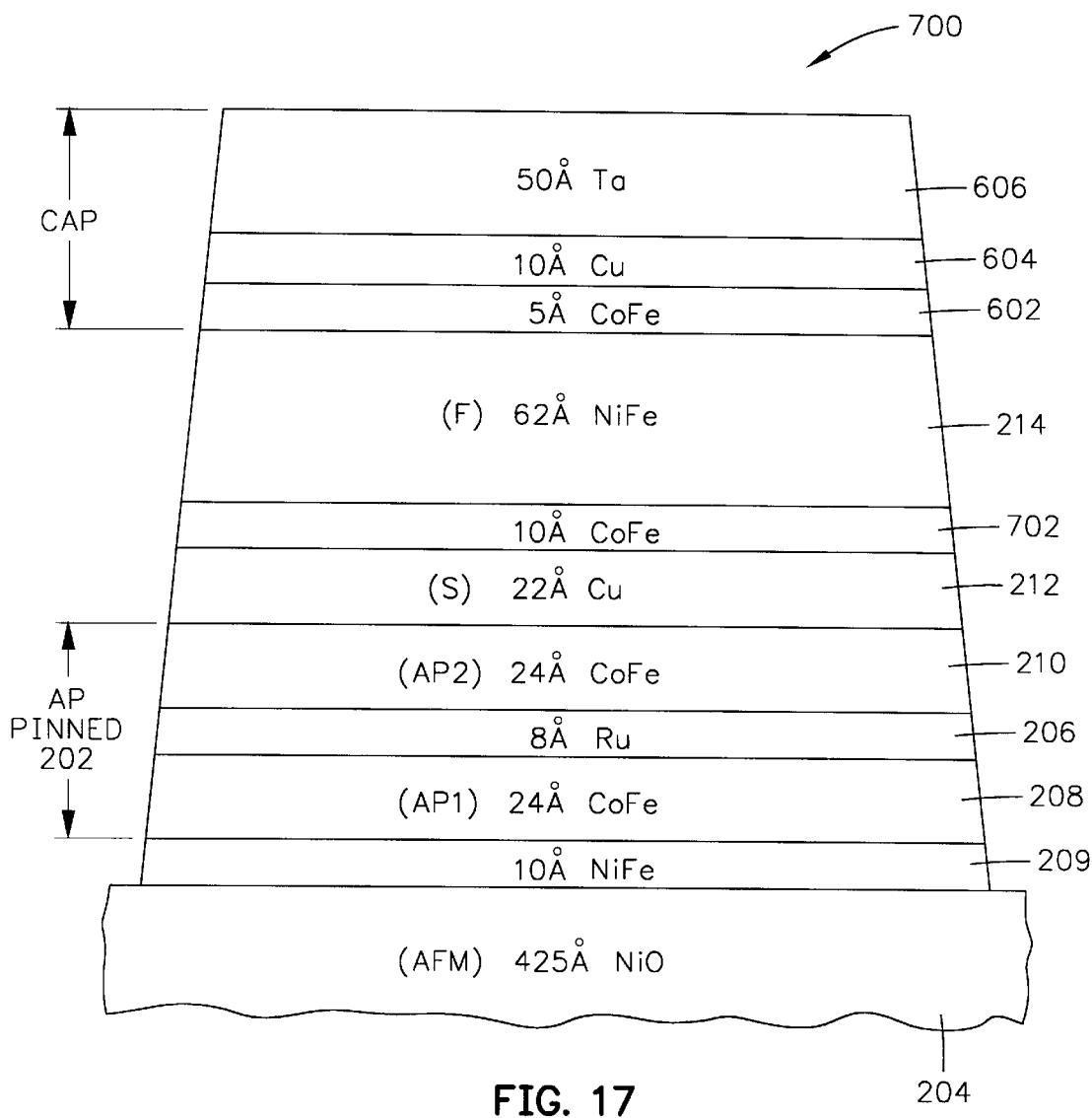
FIG. 17 is an ABS illustration of a third embodiment of the present spin valve sensor.

In FIG. 17 a sixth example and third embodiment 700 of the invention is shown which is the same as the embodiment 600 in FIG. 16 except a 10 Å thick cobalt iron (CoFe) layer is located between the free layer 214 and the spacer layer 212. The magnetoresistive coefficient (dr/R) of this sensor was 6.7% after initial reset where the sensor was subjected to 12,000 Oe for 1 hour at 230° C., the magnetoresistive coefficient (dr/R) was 6.5% and the ferromagnetic coupling field ($H_F$) was 4 Oe after annealing at 230° C. for 10 hours. This embodiment, which can also be employed with the embodiment 500 in FIG. 15, demonstrated a significant improvement in dr/R over the dr/R of the example 200 shown in FIG. 12.

Figure 18:
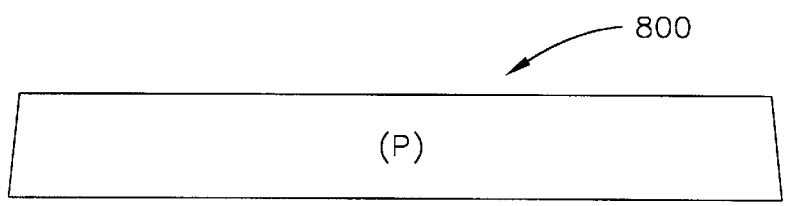
FIG. 18 is an ABS illustration of a single ferromagnetic pinned layer.

FIG. 18 shows a single layer pinned layer 800. It should be understood that in lieu of the antiparallel (AP) pinned structure 202 shown in the examples the single ferromagnetic pinned layer (P) 800 may be employed. The single pinned layer 800 may be 20 Å of cobalt iron ($Co_{90}Fe_{10}$). The interface layer of 10 Å of nickel iron (NiFe), shown in the examples, may be omitted between the pinned layer 800 and the AFM layer 204. While the first cap layer and the layers 208, 210 and 702 are preferably cobalt iron ($Co_{90}Fe_{10}$) it should be understood that cobalt iron (CoFe) in other ratios or cobalt (Co) may be substituted.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:
1. A magnetic read head comprising:
   a spin valve sensor including:
      an antiferromagnetic pinning layer;
      a ferromagnetic pinned layered structure exchange coupled to the pinning layer and having a magnetic moment pinned by the pinning layer in a first direction;
      a ferromagnetic free layer having a magnetic moment oriented in a second direction when not subjected to an applied magnetic field emanating from a source outside the read head;
      a nonmagnetic electrically conductive spacer layer located between the pinned layer structure and the free layer;
      a cap layered structure;
      the free layer being located between the cap layered structure and the spacer layer; and
      the cap layered structure including:
         a cobalt (Co) or cobalt iron (CoFe) first cap layer;
         a nonmagnetic electrically conductive second cap layer; and
         the first cap layer being located between the free layer and the second cap layer.
2. A magnetic read head as claimed in claim 1 wherein the second cap layer is tantalum (Ta).
3. A magnetic read head as claimed in claim 1 including:
   the second cap layer being copper (Cu);
   a third cap layer of tantalum (Ta); and
   the second cap layer being located between the first cap layer and the third cap layer.
4. A magnetic read head as claimed in claim 1 wherein the free layer is nickel iron (NiFe), the spacer layer is copper (Cu) and a cobalt iron (CoFe) layer is located therebetween.
5. A magnetic read head as claimed in claim 4 including:
   first and second hard bias and lead layers connected to first and second side edges of the spin valve sensor;
   nonmagnetic electrically insulative first and second read gap layers;
   the spin valve sensor and the first and second hard bias and lead layers being located between the first and second read gap layers;
   ferromagnetic first and second shield layers;
   the first and second read gap layers being located between the first and second shield layers.
6. A magnetic read head as claimed in claim 5 wherein the second cap layer is tantalum (Ta).
7. A magnetic read head as claimed in claim 6 wherein the pinned layered structure includes a single pinned ferromagnetic layer.
8. A magnetic read head as claimed in claim 6 wherein the pinned layered structure includes:
   ferromagnetic first and second antiparallel layers; and
   an antiparallel coupling layer located between the first and second antiparallel layers.
9. A magnetic read head as claimed in claim 5 wherein the cap layered structure further includes:
   the second cap layer being copper (Cu);
   a third cap layer of tantalum (Ta); and
   the second cap layer being located between the first cap layer and the third cap layer.
10. A magnetic read head as claimed in claim 9 wherein the pinned layered structure includes a single ferromagnetic layer.

11. A magnetic read head as claimed in claim 9 wherein the pinned layered structure includes:
ferromagnetic first and second antiparallel layers; and
an antiparallel coupling layer located between the first and second antiparallel layers.

12. A magnetic head assembly having a read head and a write head comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gaps portions; and
the read head including:
nonmagnetic electrically insulative first and second read gap layers;
a spin valve sensor;
first and second hard bias and lead layers connected to the spin valve sensor;
the spin valve sensor and the first and second lead layers being located between the first and second read gap layers;
a first shield layer;
the first and second read gap layers being located between the first shield layer and the first pole piece layer; and
the spin valve sensor including:
an antiferromagnetic pinning layer;
a ferromagnetic pinned layered structure exchange coupled to the pinning layer and having a magnetic moment pinned by the pinning layer in a first direction;
a ferromagnetic free layer having a magnetic moment oriented in a second direction when not subjected to an applied magnetic field emanating from a source outside the read head;
a nonmagnetic electrically conductive spacer layer located between the pinned layer structure and the free layer;
a cap layered structure;
the free layer being located between the cap layered structure and the spacer layer; and
the cap layered structure including:
a cobalt (Co) or cobalt iron (CoFe) first cap layer;
a nonmagnetic electrically conductive second cap layer; and
the first cap layer being located between the free layer and the second cap layer.

13. A magnetic head assembly as claimed in claim 12 wherein the second cap layer is tantalum (Ta).

14. A magnetic head assembly as claimed in claim 13 wherein the pinned layered structure includes a single ferromagnetic layer.

15. A magnetic head assembly as claimed in claim 13 wherein the pinned layered structure includes:
ferromagnetic first and second antiparallel layers; and
an antiparallel coupling layer located between the first and second antiparallel layers.

16. A magnetic head assembly as claimed in claim 12 wherein the cap layered structure further includes:

the second cap layer being copper (Cu);
a third cap layer of tantalum (Ta); and
the second cap layer being located between the first cap layer and the third cap layer.

17. A magnetic head assembly as claimed in claim 16 wherein the pinned layered structure includes a single ferromagnetic layer.

18. A magnetic head assembly as claimed in claim 16 wherein the pinned layered structure includes:
ferromagnetic first and second antiparallel layers; and
an antiparallel coupling layer located between the first and second antiparallel layers.

19. A magnetic head assembly as claimed in claim 12 including:
the read head further including:
a ferromagnetic second shield layer;
a nonmagnetic electrically insulative separation layer; and
the separation layer being located between the second shield layer the first pole piece layer.

20. A magnetic head assembly as claimed in claim 19 wherein the second cap layer is tantalum (Ta).

21. A magnetic head assembly as claimed in claim 20 wherein the pinned layered structure includes a single ferromagnetic layer.

22. A magnetic head assembly as claimed in claim 20 wherein the pinned layered structure includes:
ferromagnetic first and second antiparallel layers; and
an antiparallel coupling layer located between the first and second antiparallel layers.

23. A magnetic head assembly as claimed in claim 19 wherein the cap layered structure further includes:
the second cap layer being copper (Cu);
a third cap layer of tantalum (Ta); and
the second cap layer being located between the first cap layer and the third cap layer.

24. A magnetic head assembly as claimed in claim 23 wherein the pinned layered structure includes a single ferromagnetic layer.

25. A magnetic head assembly as claimed in claim 23 wherein the pinned layered structure includes:
ferromagnetic first and second antiparallel layers; and
an antiparallel coupling layer located between the first and second antiparallel layers.

26. A magnetic disk drive that includes at least one slider that has an air bearing surface (ABS), the slider supporting at least one magnetic head assembly that includes a read head and a write head, the disk drive comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gaps portions; and
the read head including:
nonmagnetic electrically insulative first and second read gap layers;
a spin valve sensor;
first and second hard bias and lead layers connected to the spin valve sensor;

the spin valve sensor and the first and second hard bias and lead layers being located between the first and second read gap layers;

a first shield layer;

the first and second read gap layers being located between the first shield layer and the first pole piece layer; and the spin valve sensor including:

an antiferromagnetic pinning layer;

a ferromagnetic pinned layered structure exchange coupled to the pinning layer and having a magnetic moment pinned by the pinning layer in a first direction;

a ferromagnetic free layer having a magnetic moment oriented in a second direction when not subjected to an applied magnetic field emanating from a source outside the read head;

a nonmagnetic electrically conductive spacer layer located between the pinned layer structure and the free layer;

a cap layered structure;

the free layer being located between the cap layered structure and the spacer layer; and the cap layered structure including:

a cobalt (Co) or cobalt iron (CoFe) first cap layer;

a nonmagnetic electrically conductive second cap layer; and the first cap layer being located between the free layer and the second cap layer;

a housing;

a magnetic disk rotatably supported in the housing;

a support mounted in the housing for supporting the magnetic head assembly with its ABS facing the magnetic disk so that the magnetic head assembly is in a transducing relationship with the magnetic disk;

means for rotating the magnetic disk;

positioning means connected to the support for moving the magnetic head assembly to multiple positions with respect to said magnetic disk; and processing means connected to the magnetic head assembly, to the means for rotating the magnetic disk and to the positioning means for exchanging signals with the magnetic head assembly, for controlling movement of the magnetic disk and for controlling the position of the magnetic head assembly.

27. A magnetic disk drive as claimed in claim 26 wherein the second cap layer is tantalum (Ta).

28. A magnetic disk drive as claimed in claim 26 wherein the cap layered structure further includes:

the second cap layer being copper (Cu);

a third cap layer of tantalum (Ta); and the second cap layer being located between the first cap layer and the third cap layer.

29. A magnetic disk drive as claimed in claim 26 including:

the read head further including:

a ferromagnetic second shield layer;

a nonmagnetic electrically insulative separation layer; and the separation layer being located between the second shield layer the first pole piece layer.

30. A magnetic disk drive as claimed in claim 29 wherein the second cap layer is tantalum (Ta).

31. A magnetic disk drive as claimed in claim 29 wherein the cap layered structure further includes:

the second cap layer being copper (Cu);

a third cap layer of tantalum (Ta); and the second cap layer being located between the first cap layer and the third cap layer.

32. A method of making a magnetic head assembly that includes a read head and a write head comprising the steps of:

making a spin valve sensor comprising the steps of:

forming an antiferromagnetic pinning layer;

forming a ferromagnetic pinned layered structure on the pinning layer;

forming a nonmagnetic electrically conductive spacer layer on the pinned layer structure;

forming a ferromagnetic free layer on the spacer layer;

forming a cap layered structure on the free layer as follows:

forming a first cap layer of cobalt (Co) or cobalt iron (CoFe) on the free layer; and forming a second cap layer of a nonmagnetic electrically conductive material on the first cap layer.

33. A method as claimed in claim 32 comprising forming the second cap layer of tantalum (Ta).

34. A method as claimed in claim 33 wherein the pinned layered structure is formed of a single ferromagnetic layer.

35. A method as claimed in claim 33 wherein the forming of the pinned layered structure includes:

forming a ferromagnetic first antiparallel layer;

forming an antiparallel coupling layer on the first antiparallel layer; and forming a ferromagnetic second antiparallel layer on the antiparallel coupling layer.

36. A method as claimed in claim 32 wherein forming the cap layered structure further includes:

forming the second cap layer of copper (Cu); and forming a third cap layer of tantalum (Ta) on the second cap layer.

37. A method as claimed in claim 36 wherein the pinned layered structure is formed of a single ferromagnetic layer.

38. A method as claimed in claim 36 wherein the forming of the pinned layered structure includes:

forming a ferromagnetic first antiparallel layer;

forming an antiparallel coupling layer on the first antiparallel layer; and forming a ferromagnetic second antiparallel layer on the antiparallel coupling layer.

39. A method as claimed in claim 32 wherein a making of the write head includes:

forming a second shield layer;

forming a nonmagnetic electrically insulative separation layer on the second shield layer;

forming a ferromagnetic first pole piece layer on the separation layer that has a yoke region located between a pole tip region and a back gap region;

forming an insulation stack with at least one coil layer embedded therein on the first pole piece layer in the yoke region;

forming a nonmagnetic electrically insulative write gap layer on the first pole piece layer in the pole tip region; and forming a ferromagnetic second pole piece layer on the write gap layer, the insulation stack and connected to the first pole piece layer in the back gap region.

40. A method as claimed in claim 39 comprising forming the second cap layer of tantalum (Ta).

41. A method as claimed in claim 40 wherein the pinned layered structure is formed of a single ferromagnetic layer.

42. A method as claimed in claim 40 wherein the forming of the pinned layered structure includes:

forming a ferromagnetic first antiparallel layer;

forming an antiparallel coupling layer on the first antiparallel layer; and forming a ferromagnetic second antiparallel layer on the antiparallel coupling layer.

43. A method as claimed in claim 39 wherein forming the cap layered structure further includes:

forming the second cap layer of copper (Cu); and forming a third cap layer of tantalum (Ta) on the second cap layer.

44. A method as claimed in claim 43 wherein the pinned layered structure is formed of a single ferromagnetic layer.

45. A method as claimed in claim 43 wherein the forming of the pinned layered structure includes:

forming a ferromagnetic first antiparallel layer;

forming an antiparallel coupling layer on the first antiparallel layer; and forming a ferromagnetic second antiparallel layer on the antiparallel coupling layer.

\* \* \* \* \*